United States Patent
Rossanese et al.

(10) Patent No.: US 7,648,663 B2
(45) Date of Patent: *Jan. 19, 2010

(54) METHOD FOR THE PRODUCTION OF PLATES MADE OF PLASTIC MATERIAL WITH PARTS OVERMOULDED BY INJECTION COMPRESSION

(75) Inventors: Afro Rossanese, Noventa di Piave (IT); Maurizio Bazzo, Oderzo (IT)

(73) Assignee: Inglass S.r.l., San Polo di Piave (TV) (IT)

( * ) Notice: Subject to any disclaimer, the term of this patent is extended or adjusted under 35 U.S.C. 154(b) by 629 days.

This patent is subject to a terminal disclaimer.

(21) Appl. No.: 11/047,481

(22) Filed: Jan. 31, 2005

(65) Prior Publication Data

US 2006/0076709 A1    Apr. 13, 2006

(30) Foreign Application Priority Data

Oct. 11, 2004    (IT)    ............... TO2004A0701

(51) Int. Cl.
    B29C 45/16    (2006.01)
(52) U.S. Cl. .................... 264/255; 264/328.8
(58) Field of Classification Search ............. 264/328.1, 264/328.7, 328.8, 255, 259, 319, 297.2, 297.8; 425/555, 135, 130, 134
    See application file for complete search history.

(56) References Cited

U.S. PATENT DOCUMENTS

| 4,519,763 | A | * | 5/1985 | Matsuda et al. | ......... 425/192 R |
| 4,569,807 | A | * | 2/1986 | Boudet | ............. 264/2.2 |
| 4,874,654 | A | * | 10/1989 | Funaki et al. | ............. 428/192 |
| 5,093,049 | A | * | 3/1992 | Uehara et al. | ............. 264/2.2 |
| 5,196,150 | A | * | 3/1993 | Mimura et al. | ............. 264/40.5 |
| 5,762,855 | A |  | 6/1998 | Betters et al. | |
| 6,322,738 | B1 | * | 11/2001 | Sicilia et al. | ............. 264/255 |
| 6,637,164 | B2 | * | 10/2003 | Kondo et al. | ............. 52/208 |

FOREIGN PATENT DOCUMENTS

| DE | 10217584 | * | 11/2002 |
| DE | 20 2004 003 468 U1 | | 7/2004 |
| JP | 5-329898 | * | 12/1993 |
| JP | 2001-150484 | * | 6/2001 |

OTHER PUBLICATIONS

Jochen Mitzler, translation of "Synergy Creates New Technology", Copyrighted—Carl Hanser Verlag, Munchen, KU Kunstostoffe, plast europe, vol. 91 (2001) 10, pp. 6-9.

Website of Georg Kaufmann AG, English version, Oct. 2001—www.konsens.de/gktool/ghtool_2001_08_022_e.htm "Mould for back injection of painted foils".

(Continued)

*Primary Examiner*—Jill L Heitbrink
(74) *Attorney, Agent, or Firm*—Heslin Rothenberg Farley & Mesiti P.C.; Victor A. Cardona

(57) ABSTRACT

A method for the production of plates of material with overmoulded parts made of plastic material of different dimensions, of shapes and colors, by means of a first injection for the formation of the plate and a subsequent injection compression for overmoulding said parts on the plate. Each injection can conveniently be performed with sequentially controlled injection spots.

8 Claims, 4 Drawing Sheets

OTHER PUBLICATIONS

U.S. Appl. No. 11/047,480, filed Jan. 31, 2005, Rossanese et al.
U.S. Appl. No. 11/047,500, filed Jan. 31, 2005, Rossanese et al.
U.S. Appl. No. 11/047,498, filed Jan. 31, 2005, Rossanese et al.
U.S. Appl. No. 11/047,483, filed Jan. 31, 2005, Rossanese et al.
U.S. Appl. No. 11/047,106, filed Jan. 31, 2005, Rossanese et al.
U.S. Appl. No. 11/047,104, filed Jan. 31, 2005, Rossanese et al.
U.S. Appl. No. 11/046,937, filed Jan. 31, 2005, Rossanese et al.
Knights, Mikell "Sequential Valve Gating" Plastics Technology, Dec. 2003, available at http://www.ptonline.com/articles/200312fa1.html.

* cited by examiner

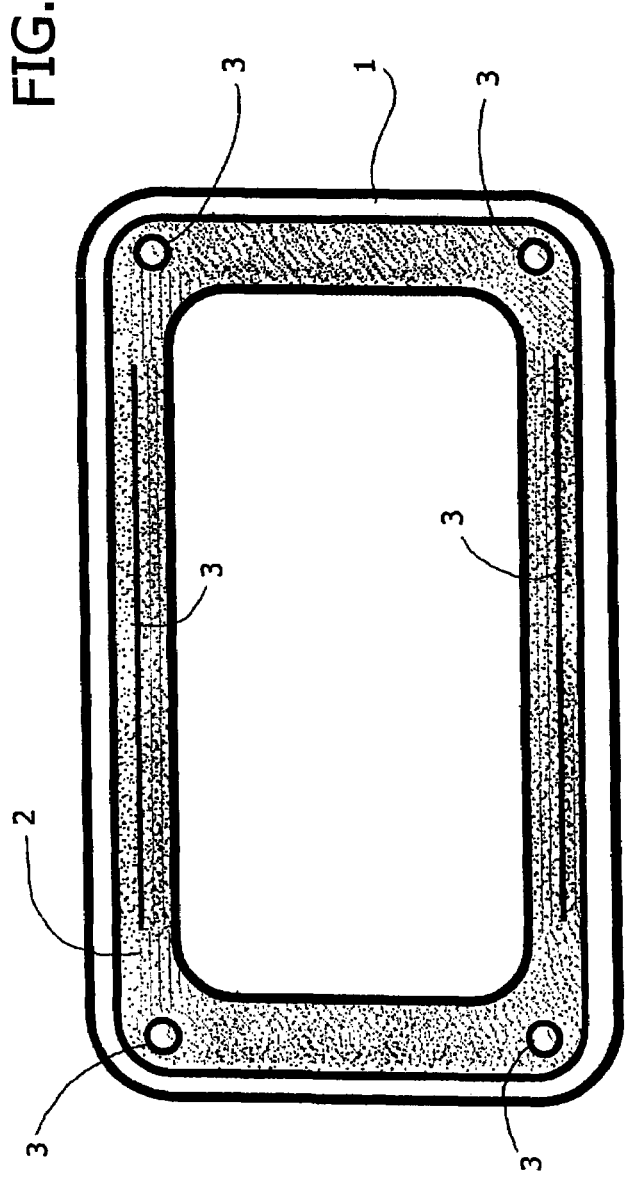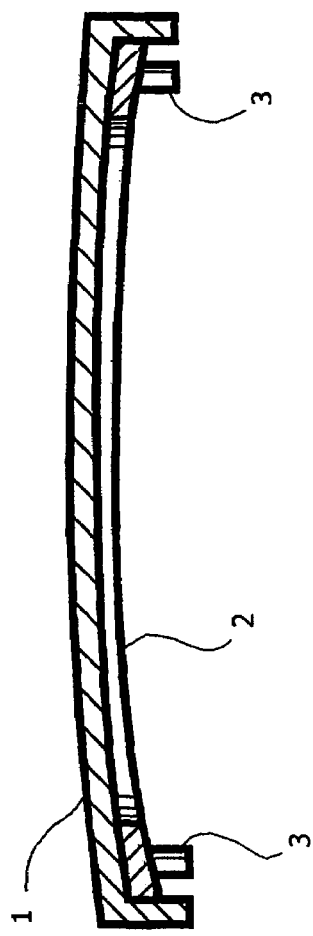

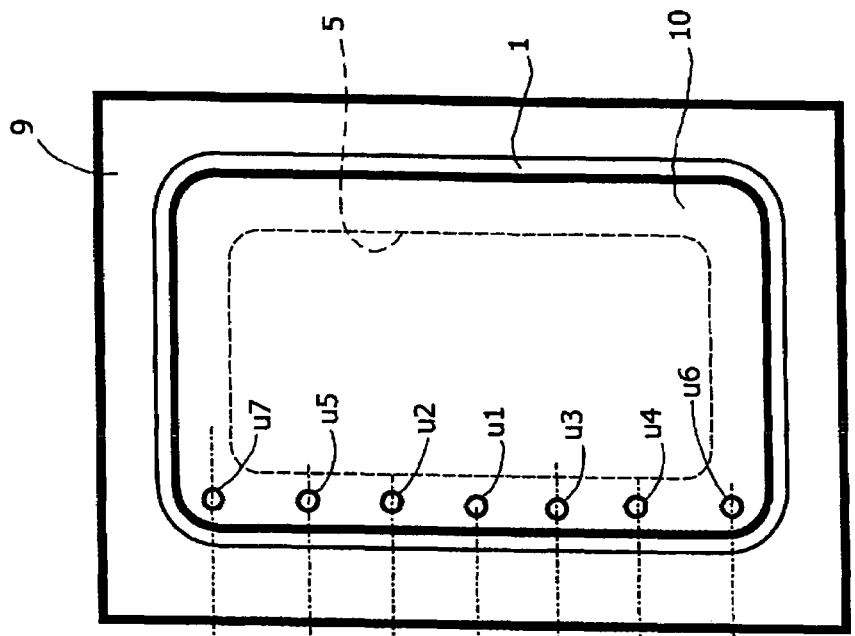
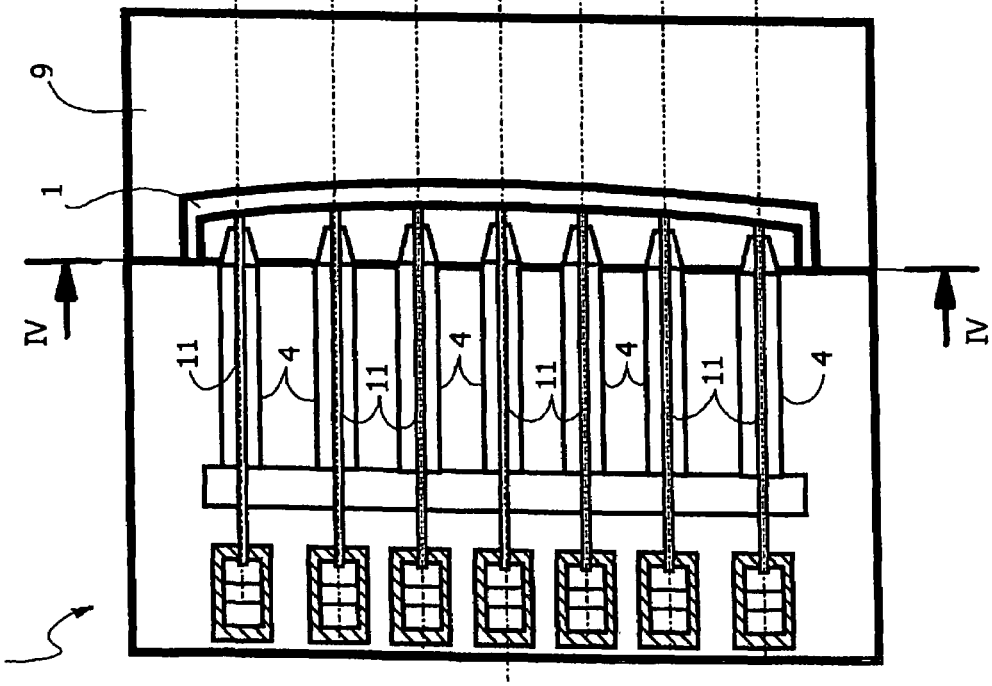

METHOD FOR THE PRODUCTION OF PLATES MADE OF PLASTIC MATERIAL WITH PARTS OVERMOULDED BY INJECTION COMPRESSION

CROSS-REFERENCE TO RELATED APPLICATIONS

This application claims priority from Italian application number TO2004A000701, filed on Oct. 11, 2004, the entire disclosure of which is incorporated herein by reference.

This application also relates to U.S. patent application Ser. No. 11/047,480, filed on Jan. 31, 2005, and titled "AN APPARATUS AND A METHOD FOR THE INJECTION-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,500, filed on Jan. 31, 2005, and titled "A PROCESS FOR THE PRODUCTION OF PLATES MADE OF TRANSPARENT PLASTIC MATERIAL WITH NON-TRANSPARENT AREAS," the contents of which are incorporated herein by reference.

This application also relates to U.S. patent application Ser. No. 11/047,498, filed on Jan. 31, 2005, and titled "A PROCESS FOR THE PRODUCTION OF PLATES MADE OF TRANSPARENT PLASTIC MATERIAL WITH NON-TRANSPARENT OVERINJECTED PARTS," the contents of which are incorporated herein by reference.

This application also relates to U.S. patent application Ser. No. 11/047,483, filed on Jan. 31, 2005, and titled "A METHOD AND AN APPARATUS FOR THE PRODUCTION OF ARTICLES MADE OF MOULDED PLASTIC MATERIAL PARTICULARLY BY MEANS OF INJECTO-COMPRESSION," the contents of which are incorporated herein by reference.

This application also relates to U.S. patent application Ser. No. 11/047,106, filed on Jan. 31, 2005, and titled "AN APPARATUS AND A METHOD FOR INJECTO-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,104, filed on Jan. 31, 2005, and titled "A PROCESS FOR THE PRODUCTION OF PLATES MADE OF PLASTIC MATERIAL WITH PARTS OVERMOULDED BY INJECTO-COMPRESSION," the contents of which are incorporated herein by reference.

This application also relates to U.S. patent application Ser. No. 11/046,937, filed on Jan. 31, 2005, and titled "AN APPARATUS AND A PROCESS FOR THE INJECTO-COMPRESSION MOULDING OF ARTICLES MADE OF PLASTIC MATERIAL WITH TWO COMPONENTS," the contents of which are incorporated herein by reference.

FIELD OF THE INVENTION

The present invention relates to the production of articles made of plastic material in general, particularly (but not exclusively) plates, with overmoulded parts.

The plates to which the invention applies may be either transparent ones or non-transparent ones, and also the parts overmoulded thereon may be either transparent ones or non-transparent ones, made of the same material as the plates or of a different material. Said parts moreover may be overmoulded in peripheral areas of the plate, for example in a continuous or discrete way along its peripheral edge, or else in different areas.

For convenience of treatment, reference will, however, be made in what follows at times to plates made of transparent plastic material and to overmoulded parts made of non-transparent plastic material, where said definitions are also understood to include any other different combination in the terms clarified above.

STATE OF THE PRIOR ART

Traditionally, plates made of transparent plastic material are produced by means of injection moulding: the transparent material, typically polycarbonate, is much more sensitive than other plastic materials to lines of flow, joints, etc., so much so that when the dimensions of the products increase, the difficulties of injection are such that it is impossible to eliminate certain typical aesthetic and optical defects unless very sophisticated injection systems are adopted. For items of modest dimensions, the so-called "film-injection" system is effectively used. This system enables many of the problems typical of these transparent plastic materials to be solved, but as the dimensions increase it does not enable sufficiently high levels of quality to be achieved. Furthermore, this type of injection involves cutting of the appendages of the film projecting from the moulded plate, said appendages having a non-negligible mass with respect to that of the product and involving an evident waste of material.

Furthermore, for these transparent plates, in relation to the different applications for which they are designed (and in particular in the case of use in the automotive or plasma television field), the reduction of residual internal stresses ("in-mould stresses") is of fundamental importance. These stresses tend in fact to deform the product, altering its optical properties.

SUMMARY OF THE INVENTION

The purpose of the invention is to overcome the limitations imposed by traditional injection systems and to enable an efficient production of plates made of transparent material (or, as has been said, non-transparent material) with non-transparent parts (or, as has been said, transparent parts) having optimal aesthetic and optical properties, as well as optimal mechanical properties, and being free from deformations.

With a view to achieving said purpose, the subject of the present invention is a process for the production of plates made of plastic material with overmoulded parts made of plastic material, basically characterized in that said parts made of plastic material are at least in part overmoulded on the plate by means of injection compression.

In the case of a transparent plate and of parts overmoulded thereon made of non-transparent material, the process according to the invention will include the following steps:
  providing a mould, a first moulding station, and a second moulding station;
  injecting the transparent plastic material within said mould in the first moulding station, thus generating said plate; and
  injecting and compressing the non-transparent plastic material within said mould in the second moulding station so as to overmould said parts on pre-set areas of the transparent plate.

In the case where said areas consist of a peripheral area of the plate, the process according to the invention may conveniently envisage the use of a set of first injectors in said first moulding station and of a set of second injectors in said second moulding station, said first and second injectors being aligned in a position directly corresponding to said peripheral area of the plate to be produced.

The injection of the plastic material of the plate can advantageously be performed according to a particular sequential modality, and also this can be followed by a step of post-compression.

BRIEF DESCRIPTION OF THE DRAWINGS

The invention will now be described in detail with reference to the annexed plate of drawings, a typical application of which is illustrated purely by way of example, in which:

FIG. 1 is a schematic dorsal elevation of a plate made of bi-component plastic material obtained using the process according to the invention;

FIG. 2 is a partially sectioned side elevation of FIG. 1;

FIG. 3 is a partially sectioned side elevation, which shows a first step of the process according to the invention;

FIG. 4 is a cross-sectional view according to the line IV-IV of FIG. 3;

DETAILED DESCRIPTION OF THE DRAWINGS

FIGS. 1 and 2 of the annexed plate of drawings are schematic representations of an example of a product made of bi-component plastic material obtained with the process according to the invention.

The product is constituted by a plate 1 made of plastic material, for example (but not necessarily) a transparent plastic material, typically polycarbonate, on the dorsal face of which there is overmoulded a perimetral frame 2 made of plastic material, for example (but not necessarily), a non-transparent plastic material, formed with appendages and projections 3 usable for the assembly of the plate in the condition of use.

The process for the production of such a bi-component product envisages two successive steps, described in what follows with reference to FIGS. 3, 4 and 5, 6, respectively.

Figure 7:
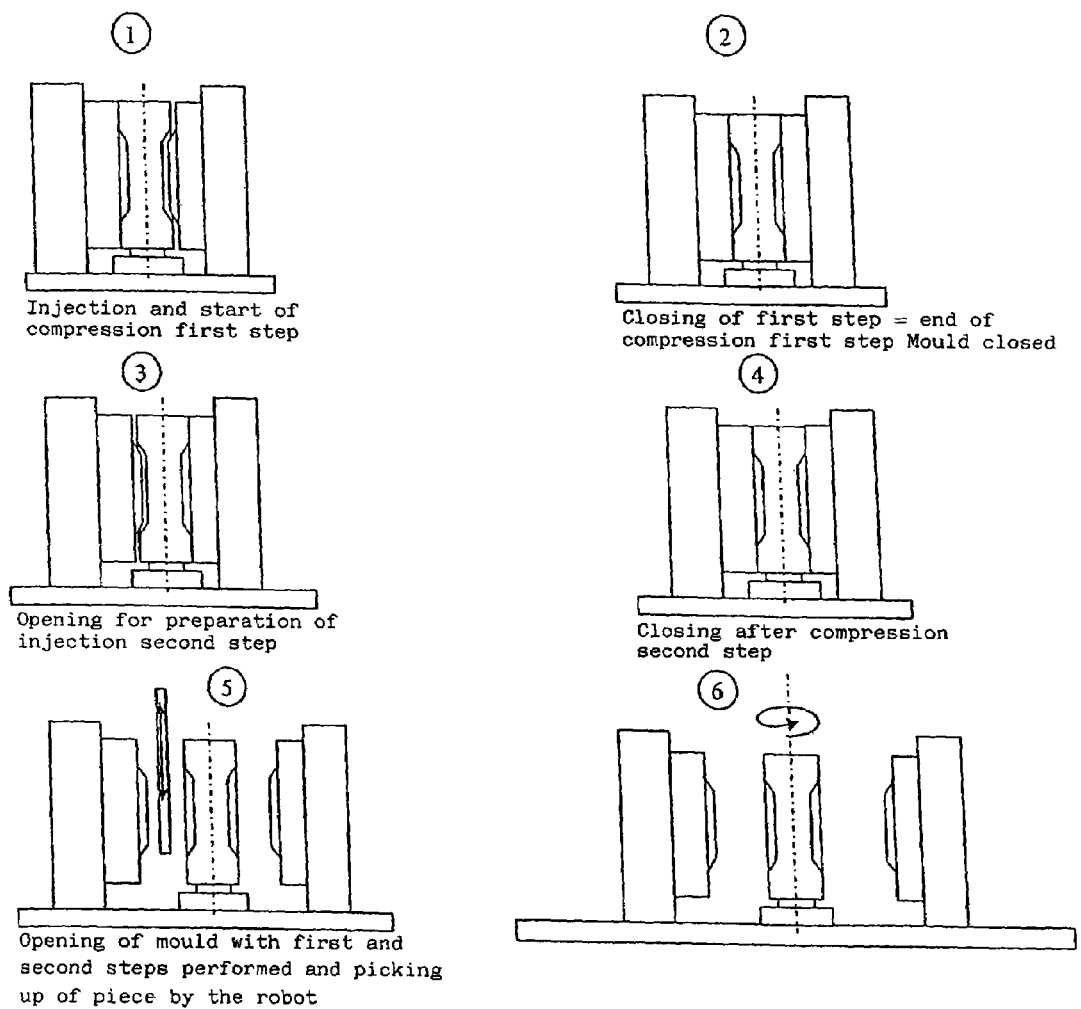
FIG. 7 is a schematic representation of the subsequent steps of the process performed using a press of the stack-mould type.

It should be noted that the process according to the invention can be implemented both on a press for injection moulding equipped with a rotating plate and on a press of the stack-mould type with rotating central surface. In the second case, reference will then be made to FIG. 7.

In both cases, two moulding stations will be provided, the first designated by 7 and the second by 8, in positions corresponding to which a mould 9 is subsequently located.

The first forming station 7 is equipped with a set of first injectors 4 of a generally conventional type, with direct plugging via a respective plug 11, which can be axially displaced between a position of closing and a position of opening for introduction within the mould 9 of the transparent plastic material coming, also in a way in itself known, from a hot chamber supplied by a plasticizing system.

It should be noted that the injectors 4 are equipped with respective ring nuts, set in substantially sealed contact with the mould 9, the conformation of which (not illustrated or described herein for reasons of brevity) may be of an innovative type, for an optimal control of temperature, said ring nuts forming the subject of a parallel Italian patent application filed on the same date by the present applicant.

The injectors 4 of the first moulding station 7 are aligned with respect to one another and located, with respect to the mould 9, in a position directly corresponding to a peripheral area of the transparent plate 1 to be moulded. Said peripheral area is designated by 10 in FIG. 4, and consists of a band adjacent to one of the larger sides of the plate 1 and contained within the internal boundary (designated by 5 in the same FIG. 4) of the perimetral frame 2 that will be subsequently formed in the second moulding station 8.

In the case of the example illustrated, the injectors 4 of the first moulding station 7 are seven in number: they are designated in FIG. 4, respectively, by u1 the central one, by u2 and u3 the ones adjacent on opposite sides to the central injector u1, by u4 and u5 the ones adjacent on opposite sides to the injectors u3 and u2, and by u6 and u7 the end ones, which are adjacent, respectively, to the injectors u4 and u5. Of course, the number of injectors may be greater or smaller, according to the dimensions of the plate, but the modalities for their actuation will in any case be similar to the ones described below.

Following upon closing of the mould 9, the injectors 4 are activated so as to introduce the transparent plastic material within the mould 9. The activation can be simultaneous or otherwise. More conveniently, it can be performed according to a particular sequential modality starting from the central injector u1 towards the end injectors u6, u7, as described and illustrated in a parallel Italian patent application filed on the same date by the present applicant.

Even though in the case of the example illustrated the injectors 4 are arranged in alignment only along the peripheral area 10 of the plate 1, i.e., as has been said along one of its larger sides, there are no particular limitations in envisaging further injectors also along the smaller sides and also along the other larger side of the plate 1. However, experimental tests conducted by the present applicant have demonstrated that the arrangement illustrated in the example is normally sufficient for optimal filling of the cavity of the mould 9 also for plates of large dimensions.

In the case where the plate 1 is of large dimensions, the reduction of residual internal stresses is of fundamental importance in that these can be generated, at the end of injection of the transparent plastic material, said internal stresses possibly inducing deformations and altering the optical properties of the plate itself.

For this reason, the injection performed as described previously in the first moulding station 7 will be conveniently followed by a step of compression for forming the plate 1. This step of post-compression can be performed with conventional modalities: in the case where the apparatus uses a press of the stack-mould type, with rotating double mould and double countermould, this step may be performed according to what is described in the German patent application No. DE-A-10217584.

At the end of forming of the transparent plate 1, on its peripheral area 10 there are identifiable the indicators or witness marks (in the form of small craters) of the injection spots corresponding to the nozzles of the injectors u1-u7.

Figure 5:
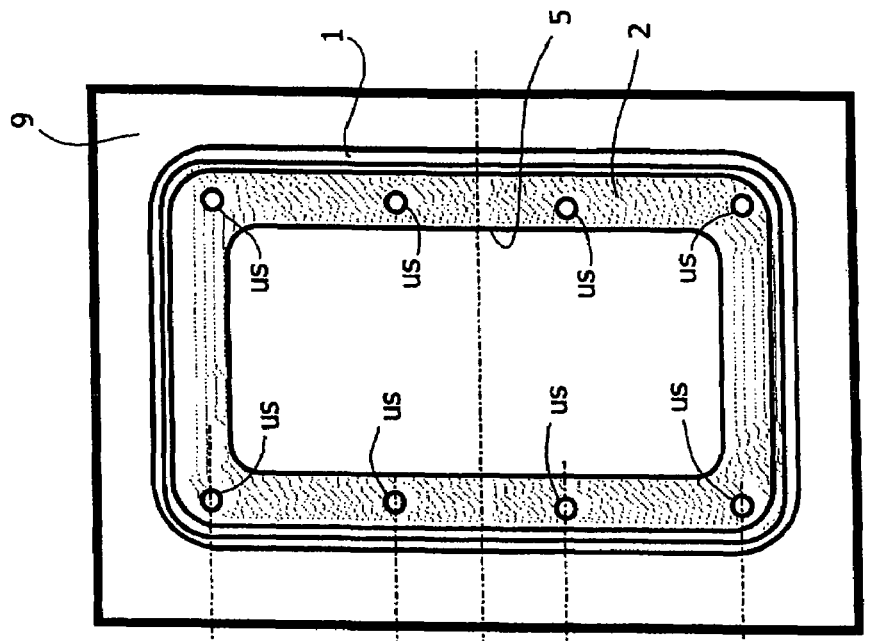
FIG. 5 is a view similar to that of FIG. 3, which shows a second step of the process according to the invention.
Figure 6:
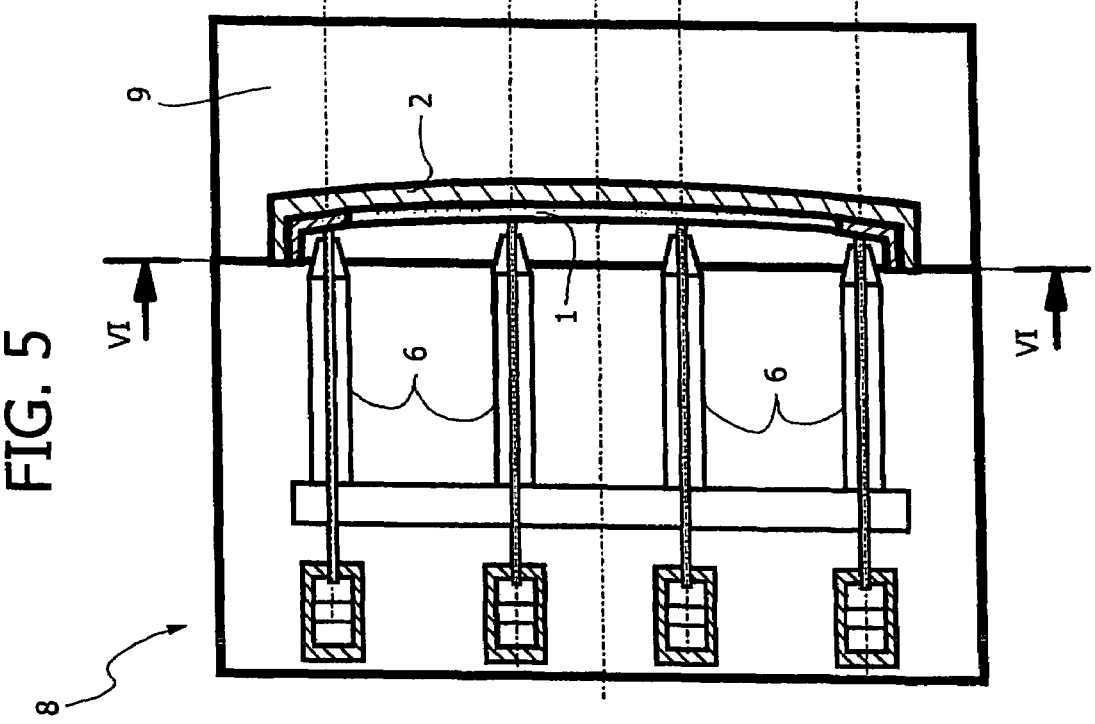
FIG. 6 is a cross-sectional view according to the line VI-VI of FIG. 5.

The mould 9 is then transferred into a position corresponding to the second moulding station 8, represented in FIGS. 5 and 6. Also in this case, there is provided at least one set of injectors 6 aligned along the peripheral area 10 of the plate 1, and possibly a second set of injectors 6 aligned in a position corresponding to the opposite area (i.e., of the other larger side of the plate 1), as illustrated in FIG. 6. The nozzles of the injectors 6 are identified in said figure by "us"

The injectors 6 of the one or more sets may be fewer in number than the injectors 4 of the first moulding station 7, for example four in number, and it is not necessary for them to be plugging ones. These nozzles 6 may be controlled in sequence or else with simultaneous opening.

The non-transparent plastic material injected by the nozzles 6 and hence compressed will come to form the peripheral frame 2, overmoulding it on the dorsal face of the transparent plate 1 between the perimetral line 5 and the peripheral edge thereof, covering the indicators or witness marks of the injection spots corresponding to the nozzles u1-u7 of the first moulding station 7.

The step of post-compression of the peripheral frame 2 may, for example, be actuated, in the case where the moulding apparatus uses a stack-mould press, with the modalities schematically illustrated in the successive steps 1-6 of FIG. 6, or else with different and more efficient modalities described in parallel Italian patent applications filed on the same date by the present applicant.

The process according to the invention enables all the limitations imposed by conventional moulding systems to be overcome, and enables an efficient production of bi-component plates, also with transparent surfaces or non-transparent surfaces of large dimensions, free from internal stresses or in any case with extremely low levels of stress and such as to prevent deformations and alterations of their optical properties. These effects are a direct consequence of the peculiar characteristics of the process according to the invention.

Of course, the details of construction of the apparatus described by way of example for the embodiment of the process may vary widely with respect to what is described and illustrated herein, without thereby departing from the scope of the present invention, as defined in the ensuing claims. Thus, for example, the injection compression may be applied only to some of the parts overmoulded on the plate, whereas for others other methodologies may be used.

The invention claimed is:

1. A process for the production of plates with overmoulded parts, the process comprising:
    moulding a plate using a transparent material by injection compression in a mould in a first moulding station utilizing a set of first injectors located in the first moulding station and aligned relative to each other along a periphery of the mould corresponding to only one side of a peripheral area of the plate, the set of first injectors being plugged and where the injection compression starts at the end of an injection step through the first set of injectors and where visible witness marks are created by the plugged set of first injectors;
    transferring the mould to a second moulding station;
    overmoulding parts on said plate using a non-transparent material to create a frame on the peripheral area of the plate in the mould in the second moulding station utilizing a set of second injectors located in the second moulding station and aligned relative to each other along the periphery of the mould corresponding to the frame of the peripheral area of the plate, the set of second injectors comprising at least two injectors located on a side of the frame of the peripheral area of the plate and at least two injectors located on an opposite side of the frame of the peripheral area of the plate, wherein the non-transparent material covers the witness marks from the set of first injectors of the first moulding station.

2. The process according to claim 1, wherein the injection compression comprises a step of injection of the plastic material of the plate via said first set of injectors, the step performed according to a sequential modality.

3. The process according to claim 2, wherein the step of injection of the plastic material of said overmoulded parts via said second set of injectors is performed according to a sequential modality.

4. The process according to claim 2, wherein the step of injection of the plastic material of said overmoulded parts via said second set of injectors is performed with a simultaneous modality.

5. The process according to claim 1, wherein said set of first injectors in said first moulding station gives rise along said peripheral area of the plate to indicators or witness marks of injection then covered by said overmoulded peripheral edge.

6. The process according to claim 1, wherein said plate is transparent and said parts overmoulded thereon are non-transparent, the process further comprising the following steps:
    injecting the transparent plastic material within said mould in the first moulding station, thus generating said plate; and
    injecting and compressing the non-transparent plastic material within said mould in the second moulding station so as to overmould said parts on pre-set areas of the transparent plate.

7. The process according to claims 6, wherein the compressing comprises compressing using a press of the stack-mould type.

8. The process according to claim 1 wherein the overmoulding of the parts to create the frame comprises overmoulding by injection compression.

* * * * *